United States Patent
Li

(10) Patent No.: US 10,277,047 B2
(45) Date of Patent: Apr. 30, 2019

(54) MULTI-FUNCTION CAR-MOUNTED CHARGER

(71) Applicant: Wenjie Li, Guangdong (CN)

(72) Inventor: Wenjie Li, Guangdong (CN)

(73) Assignee: Wenjie Li, Guangzhou, Guangdong (CN)

( * ) Notice: Subject to any disclaimer, the term of this patent is extended or adjusted under 35 U.S.C. 154(b) by 152 days.

(21) Appl. No.: 15/415,470

(22) Filed: Jan. 25, 2017

(65) Prior Publication Data

US 2018/0062407 A1    Mar. 1, 2018

(30) Foreign Application Priority Data

Aug. 31, 2016    (CN) .................. 2016 2 1032813 U

(51) Int. Cl.
| | |
|---|---|
| *H02J 7/00* | (2006.01) |
| *B60Q 3/88* | (2017.01) |
| *B60Q 3/59* | (2017.01) |
| *B60Q 3/74* | (2017.01) |
| *B60Q 3/82* | (2017.01) |

(Continued)

(52) U.S. Cl.
CPC .............. *H02J 7/0052* (2013.01); *B60Q 1/24* (2013.01); *B60Q 1/2615* (2013.01); *B60Q 1/52* (2013.01); *B60Q 3/275* (2017.02); *B60Q 3/35* (2017.02); *B60Q 3/59* (2017.02); *B60Q 3/74* (2017.02); *B60Q 3/82* (2017.02); *B60Q 3/88* (2017.02); *B60R 16/02* (2013.01); *B60R 16/03* (2013.01); *H02J 7/0042* (2013.01); *H02J 2007/0062* (2013.01)

(58) Field of Classification Search
CPC ........... H02J 7/0052; B60Q 3/59; B60Q 3/74; B60Q 3/82; B60Q 3/88; B60Q 3/35; B60Q 3/275; B60Q 1/2615; B60R 16/02; B60R 16/03

USPC .................................................. 307/9.1, 10.1
See application file for complete search history.

(56) References Cited

U.S. PATENT DOCUMENTS

| | | | |
|---|---|---|---|
| 2014/0111980 A1* | 4/2014 | Cheng ................ | H01R 13/7175 362/183 |
| 2016/0352100 A1* | 12/2016 | Cheng ...................... | H02J 1/06 |

FOREIGN PATENT DOCUMENTS

| | | |
|---|---|---|
| CN | 201503891 U | 6/2010 |
| CN | 201639340 U | 11/2010 |

(Continued)

*Primary Examiner* — Hal Kaplan
(74) *Attorney, Agent, or Firm* — Mintz Levin Cohn Ferris Glovsky and Popeo, P.C.; Kongsik Kim; Derek E. Constantine

(57) ABSTRACT

A multi-function car-mounted charger comprises a main housing, a lighting housing, a power input portion, a main circuit, a rechargeable battery, a magnet, a power output portion and a lighting portion; the power input portion, the main circuit, the rechargeable battery, the magnet, and the power output portion are disposed in the main housing; the lighting portion is disposed in the lighting housing; the power input portion, the rechargeable battery, the power output portion, and the lighting portion are electrically connected with the main circuit respectively; the power input portion comprises a first electrode and a second electrode, both of which are electrically connected with the main circuit respectively; and the first electrode is provided with a cone body. The car-mounted charger is diverse in function and may be attracted onto a car shell through the magnet.

16 Claims, 7 Drawing Sheets

(51) Int. Cl.
  *B60Q 3/35* (2017.01)
  *B60Q 1/52* (2006.01)
  *B60Q 3/275* (2017.01)
  *B60R 16/02* (2006.01)
  *B60R 16/03* (2006.01)
  *B60Q 1/26* (2006.01)
  *B60Q 1/24* (2006.01)

(56) References Cited

FOREIGN PATENT DOCUMENTS

CN    203103999 U    7/2013
CN    204046210 U    12/2014
WO    WO-8703354 A1 *  6/1987  .............. F21L 4/085

* cited by examiner

MULTI-FUNCTION CAR-MOUNTED CHARGER

CROSS-REFERENCE TO RELATED APPLICATIONS

This application claims priority to Chinese Application No. CN 201621032813.X having a filing date of Aug. 31, 2016, the entire contents of which are hereby incorporated by reference.

FIELD OF TECHNOLOGY

The present utility model relates to a car-mounted charger, and in particular to a multi-function car-mounted charger.

BACKGROUND

A car-mounted charger is typically a device which is used on a car and charges a mobile phone and other portable devices by being inserted into a cigarette lighter hole, making use of power supplied by the car battery and converting the power into a power output with a desired voltage. The car-mounted charger in the prior art has a single function, and though some car-mounted chargers are provided with electric lights, the electric lights are simple in color and are only for the purpose of common lighting; a light holder is fixed so that a lighting angle is not adjustable; the car-mounted charger is difficult to fix, for example, the car-mounted charger needs to be held by hand during the changing of a car tyre or the detection of an engine compartment, which is inconvenient to use; and the car-mounted charger cannot be used for breaking a window in an emergency in-car circumstances.

SUMMARY

To solve the technical problems above, the present utility model provides a multi-function car-mounted charger with the functions of lighting, warning, window breaking, magnet attraction-based fixation and lighting angle adjustment.

A technical solution employed by the present utility model is as follows:

a multi-function car-mounted charger comprises a main housing, a lighting housing, a power input portion, a main circuit, a rechargeable battery, a magnet, a power output portion and a lighting portion; the power input portion, the main circuit, the rechargeable battery, the magnet, and the power output portion are disposed in the main housing; the lighting portion is disposed in the lighting housing; the power input portion, the rechargeable battery, the power output portion, and the lighting portion are electrically connected with the main circuit respectively; the power input portion comprises a first electrode and a second electrode, both of which are electrically connected with the main circuit respectively; and the first electrode is provided with a cone body.

Further, the first electrode is a positive-electrode conductive head, which comprises a thread portion and a cone body; and the thread portion is in thread engagement with the main housing, and the cone body is fixed on an end face of the thread portion.

Further, the second electrode is a U-shaped negative-electrode elastic piece, two sides of which are provided with projection portions; and a side wall of the main housing is provided with two negative-electrode through holes, the negative-electrode elastic piece is fixed in the main housing, and the projection portions project through the negative-electrode through holes and are exposed out of the main housing.

Further, the magnet and the rechargeable battery are elongated and are both fixed in the main housing in parallel, and the magnet is close to an inner wall of the main housing.

Further, the power output portion is a USB socket, and the main circuit comprises a voltage conversion module; and power is input into the main circuit from the power input portion, and the voltage conversion module of the main circuit outputs the power to the USB socket after converting a voltage.

Further, the lighting portion comprises a lighting circuit and light pieces; the lighting circuit is electrically connected with the main circuit, and the light pieces are electrically connected with the lighting circuit; and the lighting housing is rotatable relative to the main housing to adjust a lighting angle of the light pieces.

Further, the lighting portion also comprises rotary shafts, the lighting housing is articulated with the main housing through the rotary shafts, and the lighting housing is capable of rotating outwards by any angle within 90 degrees by taking the rotary shafts as a center.

Further, the rotary shafts are internally provided with electric wires, with one end fixed in the lighting housing and electrically connected with the lighting circuit, and another end fixed in the main housing and electrically connected with the main circuit.

Further, the light pieces comprise a white-light illumination light and a red-light warning light.

Further, the lighting portion also comprises a lighting switch, which comprises a button cap, a button pin and a button support; the lighting circuit is provided with a button switch; the button cap is fixed on an outer wall of the lighting housing; the button support is fixed on an inner wall of the lighting housing; the button pin is mounted on the button support and is close to the button cap; and when the button cap is pressed, the button pin moves towards inside of the lighting housing and starts the button switch on the lighting circuit so that the lighting circuit supplies power to the light pieces.

The car-mounted charger of the present utility model is diverse in function and may be attracted onto a car housing through the magnet as a lighting device in addition to the function of charging the mobile phone and other devices; the car-mounted charger does not need to be held by hand during the changing of a car tyre or the detection of an engine compartment, and can be used for lighting conveniently by rotating the lighting housing to adjust the light angle; the car-mounted charger has the white-light illumination light available for lighting, and the red-light warning light capable of warning a car driver behind to avoid rear-end collision; and moreover, the positive-electrode conductive head of the car-mounted charger can also be used as a window breaking cone for breaking a car window to escape from the car in emergency circumstances.

For better understanding and implementation, the present utility model is illustrated in detail below in conjunction with the accompanying drawings.

DETAILED DESCRIPTION

Figure 1:
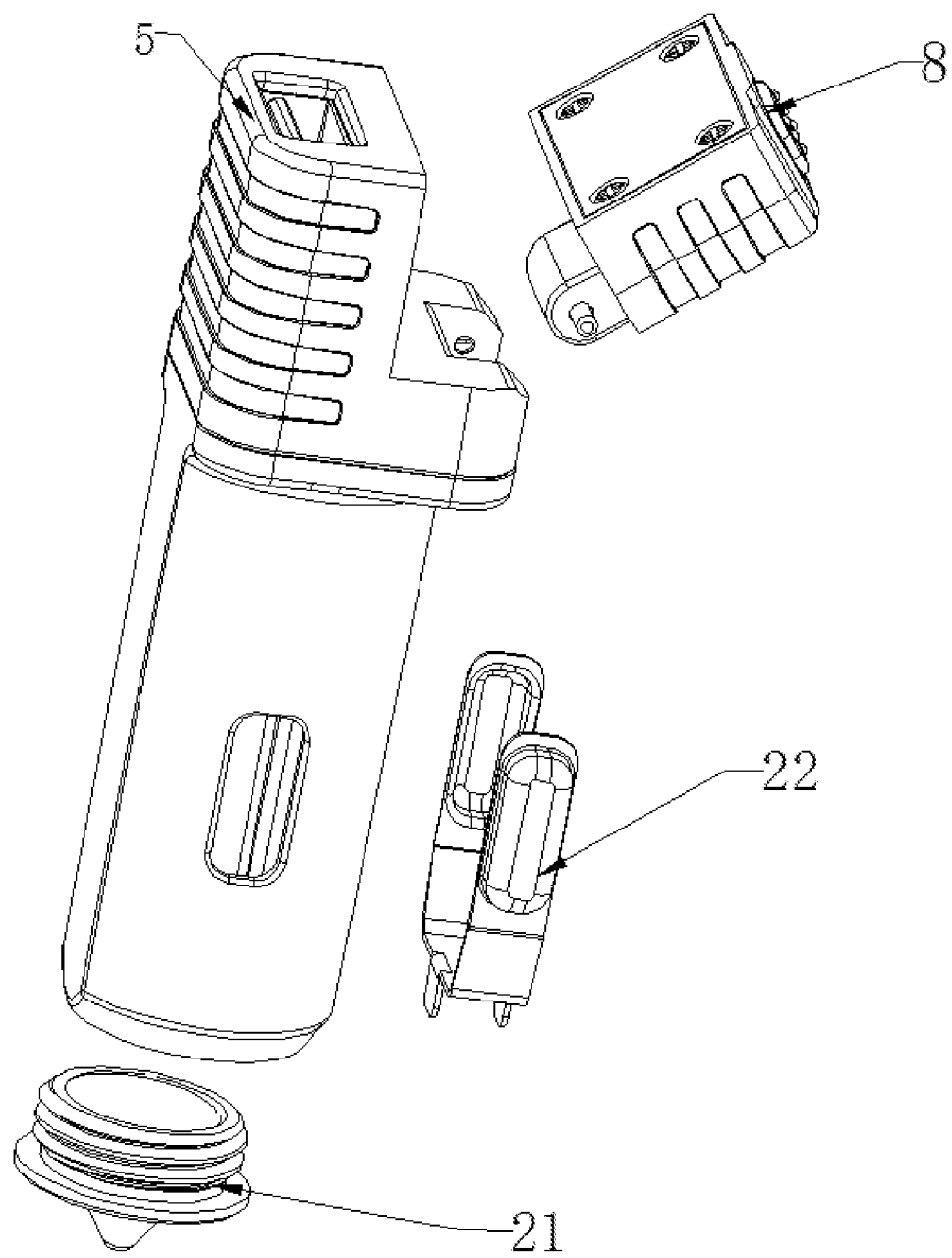
FIG. 1 is a three-dimensional view of a car-mounted charger of the present utility model.
Figure 2:
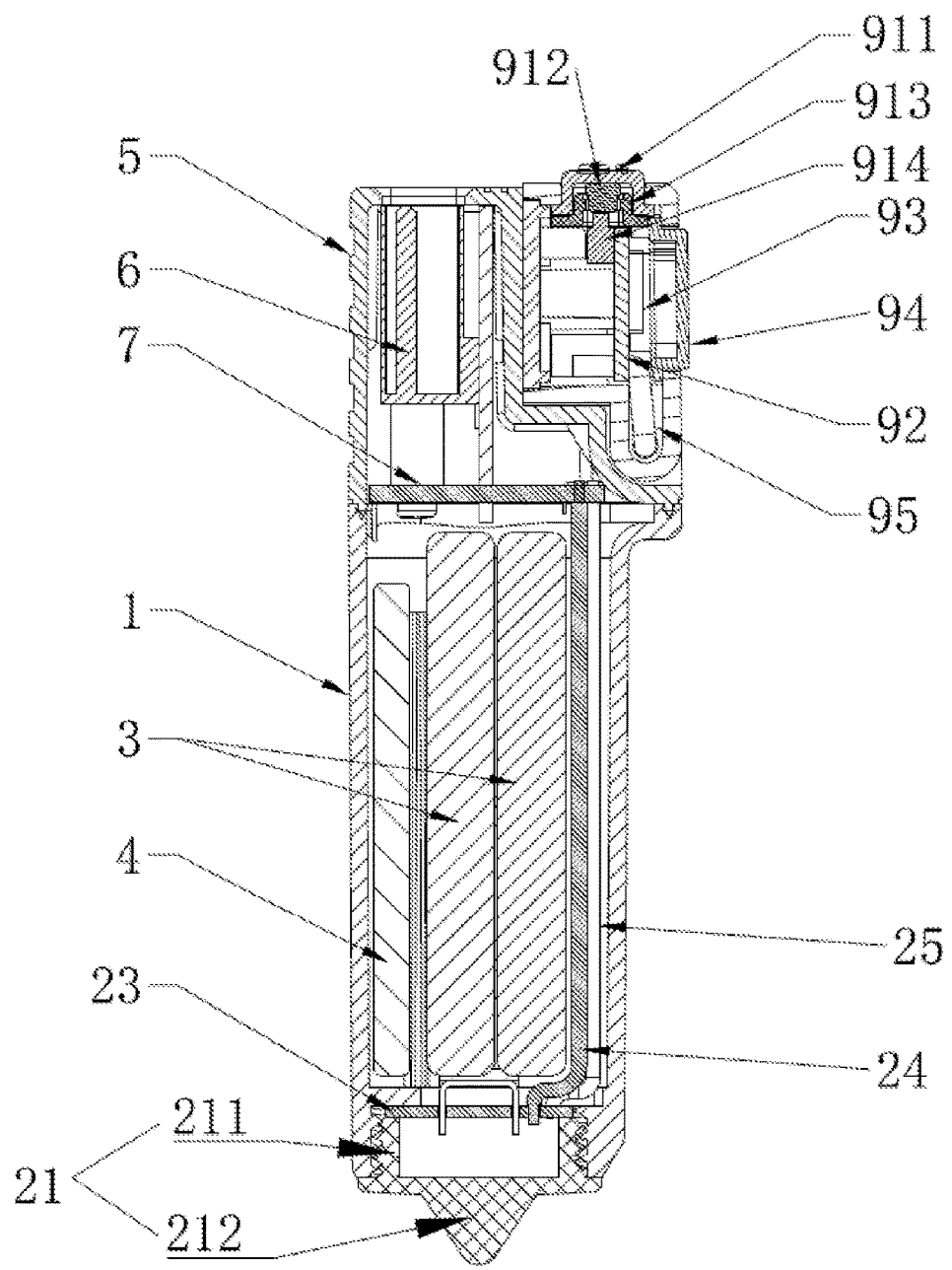
FIG. 2 is a sectional view of the car-mounted charger of the present utility model.
Figure 3:
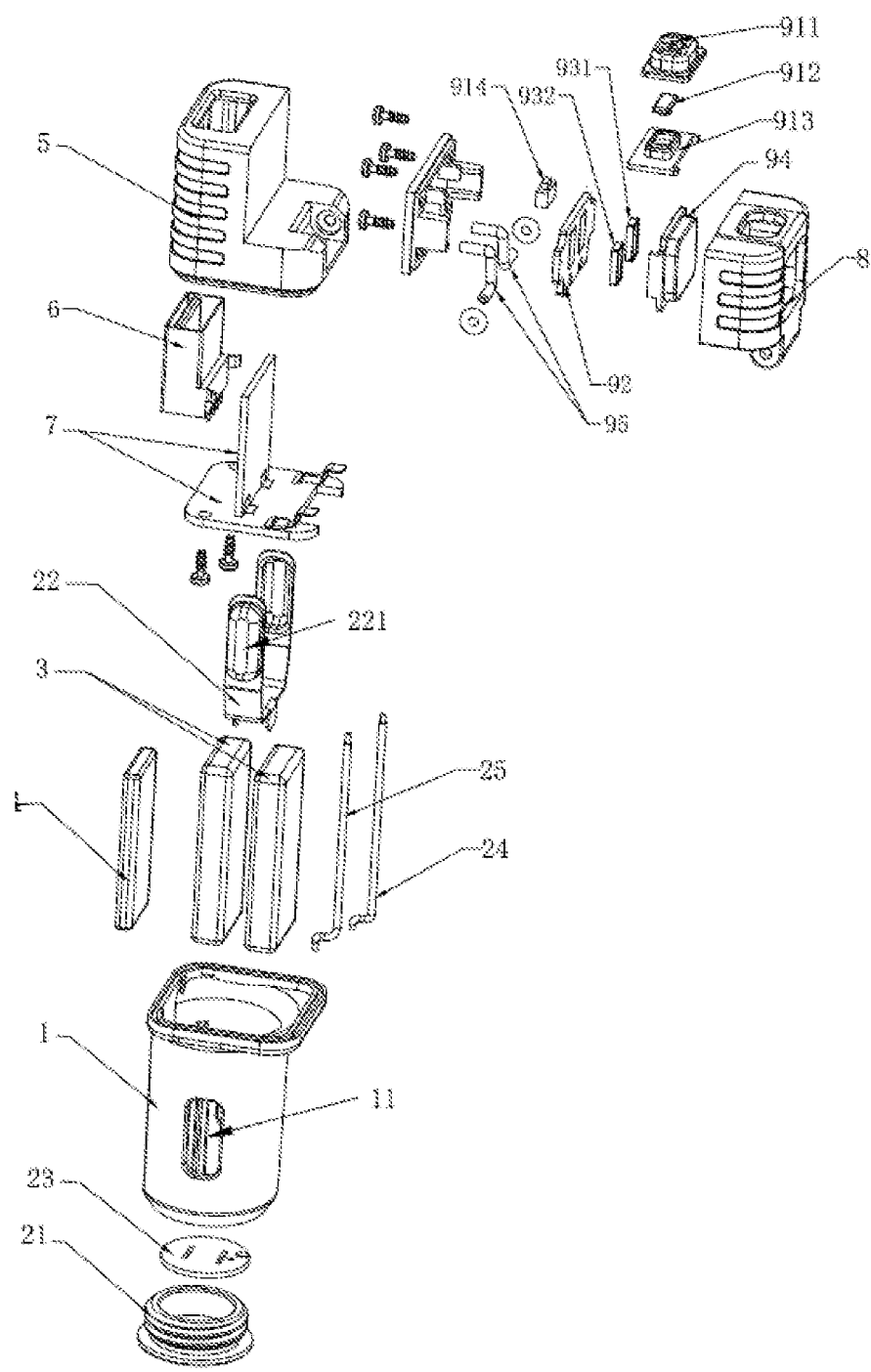
FIG. 3 is an exploded view of the car-mounted charger of the present utility model.

With reference to FIG. 1-FIG. 3, a three-dimensional view, a sectional view and an exploded view of a car-mounted charger of the present utility model are provided respectively. The multi-function car-mounted charger of the present utility model comprises a main housing, a power input portion, a rechargeable battery 3, a magnet 4, a power output portion 6, a main circuit 7, a lighting housing 8 and a lighting portion. The main housing comprises a first main housing 1 and a second main housing 5, which are detachably fixed connected to each other; the power input portion, the rechargeable battery 3, and the magnet 4 are fixed in the first main housing 1; the power output portion 6 and the main circuit 7 are fixed in the second main housing 5; and the lighting portion is fixed in the lighting housing 8 which is articulated with the second main housing 5. The main circuit 7 is electrically connected with the power input portion, the rechargeable battery 3, the power output portion 6 and the lighting portion respectively.

The first main housing 1 has a hollow cylinder shape, with one end open and the other end in detachably fixed connection with the second main housing 5, and two negative-electrode through holes 11 are formed in an outer wall of the first main housing 1.

The power input portion comprises a first electrode, a second electrode, a PCB adapter plate 23, a positive-electrode conductive wire 24 and a negative-electrode conductive wire 25; and specifically, the first electrode is a positive-electrode conductive head 21, and the second electrode is a negative-electrode elastic piece 22. The positive-electrode conductive head 21 is made of a metal material and comprises a thread portion 211 and a cone body 212; the thread portion 211 is a hollow cylinder with one end open and one end closed and is provided with an outer thread threaded and engaged onto one end of the first main housing 1; the cone body 212 is fixed on a closed end face of the thread portion 211; the positive-electrode conductive head 21 may be used as either an electrode in case of connection with a positive electrode of a car power supply, or a window breaking cone in emergency circumstances. In other embodiments, the positive-electrode conductive head may be of other shapes or structures, for example, the thread portion is made firmer if it is a solid cylinder. The negative-electrode elastic piece 22 is a U-shaped elastic metal piece and is fixedly clamped in the first main housing 1; two sides of the negative-electrode elastic piece 22 are provided with projecting portions 221, which project through the negative-electrode through holes 11 and are exposed out of the first main housing 1 to be possibly connected with the negative electrode of a car power supply. The PCB adapter plate 23 is fixed on an open end face of the thread portion 211 of the positive-electrode conductive head 21, and the positive-electrode conductive wire 24 is connected with the PCB adapter plate 23 at one end and connected with a PCBA plate of the main circuit 7 at the other end so that the positive-electrode conductive head 21 is electrically connected with the main circuit 7. The lower end of the negative-electrode elastic piece 22 is connected with the PCB adapter plate 23 and the negative-electrode conductive wire 25 is connected with the PCB adapter plate 23 at one end and connected with the PCBA plate of the main circuit 7 at the other end so that the negative-electrode elastic piece 22 is electrically connected with the main circuit 7.

The rechargeable battery 3 and the magnet 4 are elongated and are both fixed in the first main housing 1 in parallel, and the magnet 4 is close to the inner wall of the first main housing 1; and when in use, the first main housing 1 is pressed close to the car shell so that the car-mounted charger is attracted onto the car shell through the magnet 4. The rechargeable battery 3 is specifically a polymer battery.

Figure 4:
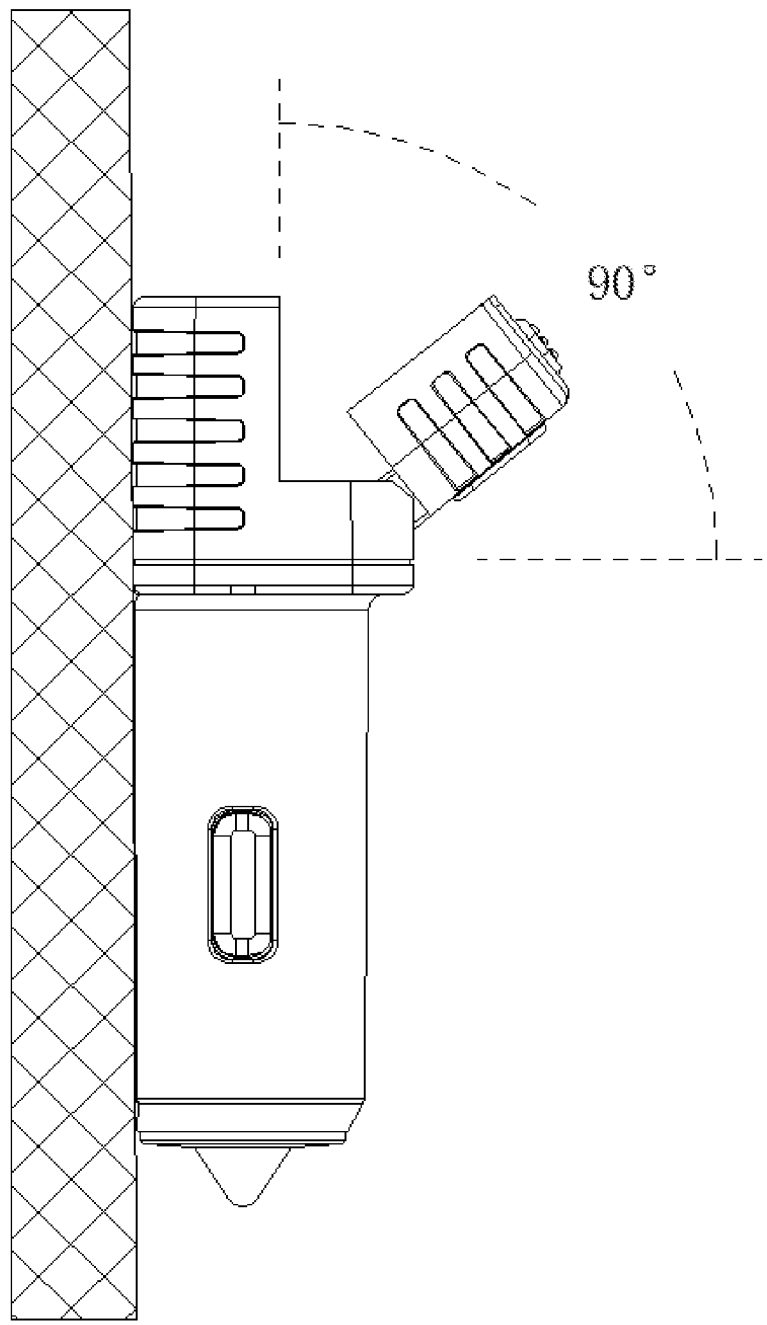
FIG. 4 is a diagram of the car-mounted charger of the present utility model in a use state.

The second main housing 5 is internally fixedly provided with the power output portion 6 and the PCBA plate of the main circuit 7, and the power output portion is specifically a USB socket. With reference to FIG. 4, the diagram shows the car-mounted charger of the present utility model in a use state. An outer wall of the second main housing 5 is provided with a recess; one end of the lighting housing 8 is articulated with the second main housing 5; and the lighting housing 8 can be either disposed in the recess or leave the recess by rotating outwards by any angle within 90 degrees with the articulated end.

Figure 5:
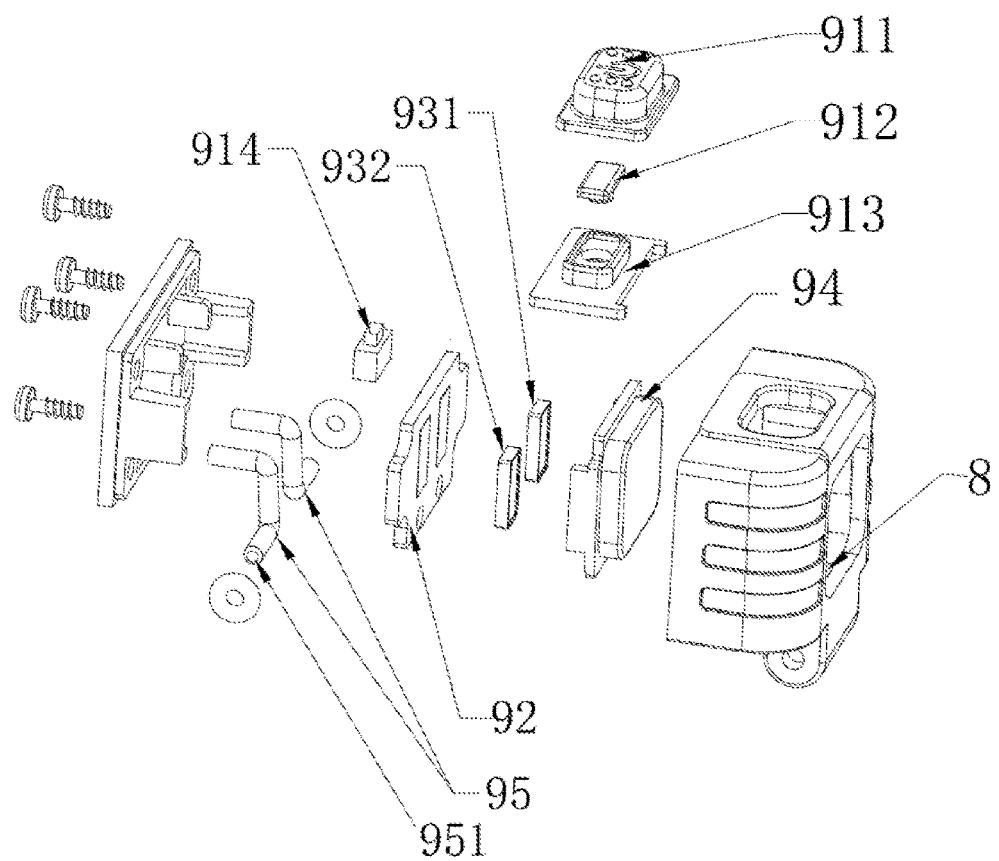
FIG. 5 is an exploded view of a lighting housing and a lighting portion of the present utility model.
Figure 6:
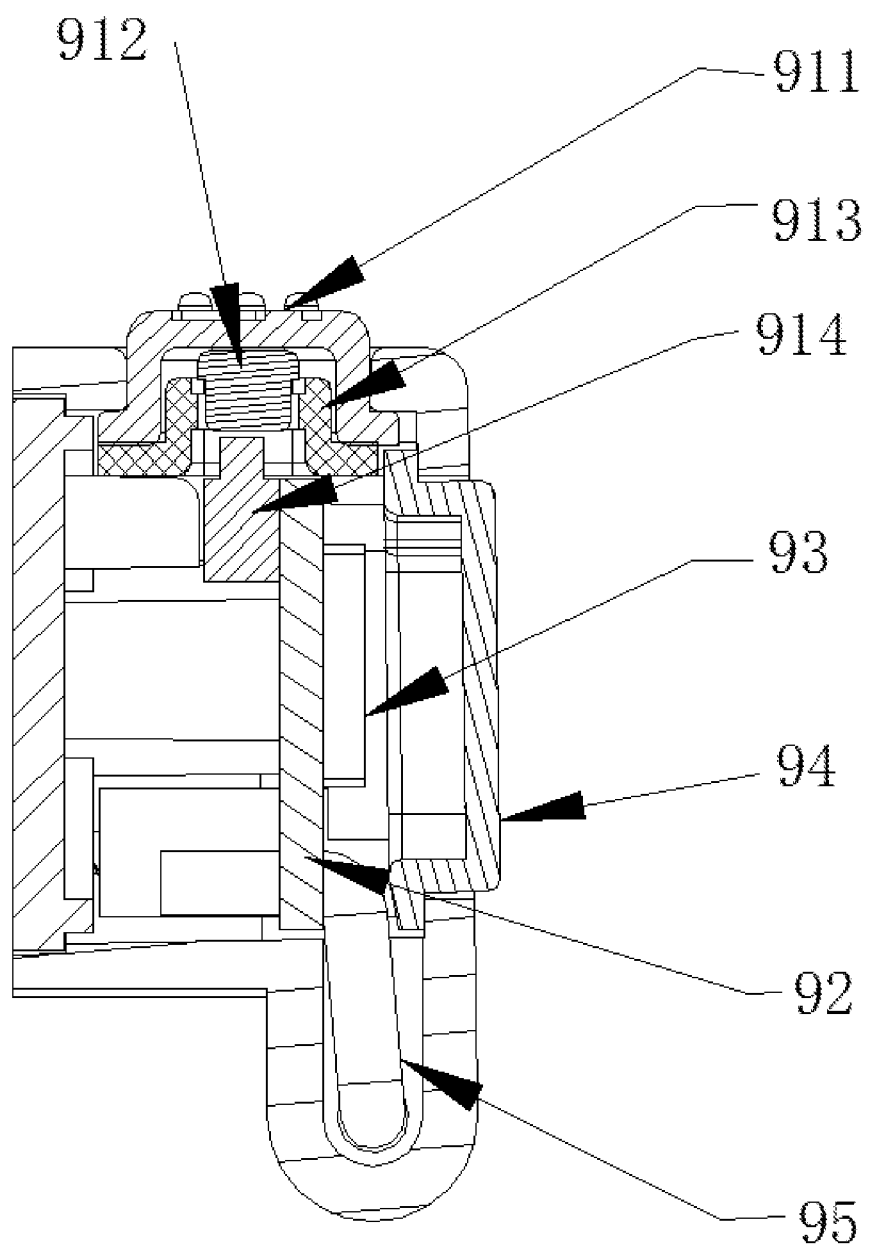
FIG. 6 is an sectional view of the lighting housing and the lighting portion of the present utility model.

With reference to FIG. 5 and FIG. 6, the lighting housing and the lighting portion of the present utility model of the present utility model are illustrated in an exploded view and a sectional view, respectively. The lighting portion comprises a lighting switch, a lighting circuit 92, a light cover 94, light pieces 93 and rotary shafts 95. The lighting switch is fixed on the lighting housing 8; the lighting circuit 92 is fixed in the lighting housing 8; the light pieces 93 are fixed on the lighting circuit 92; the light cover 94 is made of a transparent material, covers the light pieces 93 and is fixed in corresponding through holes of the lighting housing 8 to allow the light illuminating outwards. The rotary shafts 95 connects the lighting housing 8 with the second main housing 5 in an articulation manner. The lighting switch specifically comprises a button cap 911, a button pin 912 and a button support 913; the lighting circuit 92 is provided with a button switch 914; the button cap 911 is fixed on the outer wall of the lighting housing 8; the button support 913 is fixed on the inner wall of the lighting housing 8; the button pin 912 is mounted on the button support 913 and is close to the button cap 911; and when the button cap 911 is pressed, the button pin 912 moves towards inside of the lighting housing 8 and starts the button switch 914 on the lighting circuit 92 so that the lighting circuit 92 supplies power to the light pieces 93. The light pieces 93 specifically comprise a white-light illumination light 931 and a red-light warning light 932, and accordingly, the lighting switch also comprises a white-light switch and a red-light switch. One end of the rotary shafts 95 are inserted into the lighting housing 8 and fixed, and the other end of the rotary shafts 95 are inserted into the second main housing 5 and fixed; and the rotary shafts are internally provided with electric wires 951, with one end, which is inserted into the lighting housing 8, being electrically connected with the lighting circuit 92, and the other end, which is inserted into the second main housing 5, being electrically connected with the main circuit 7.

Figure 7:
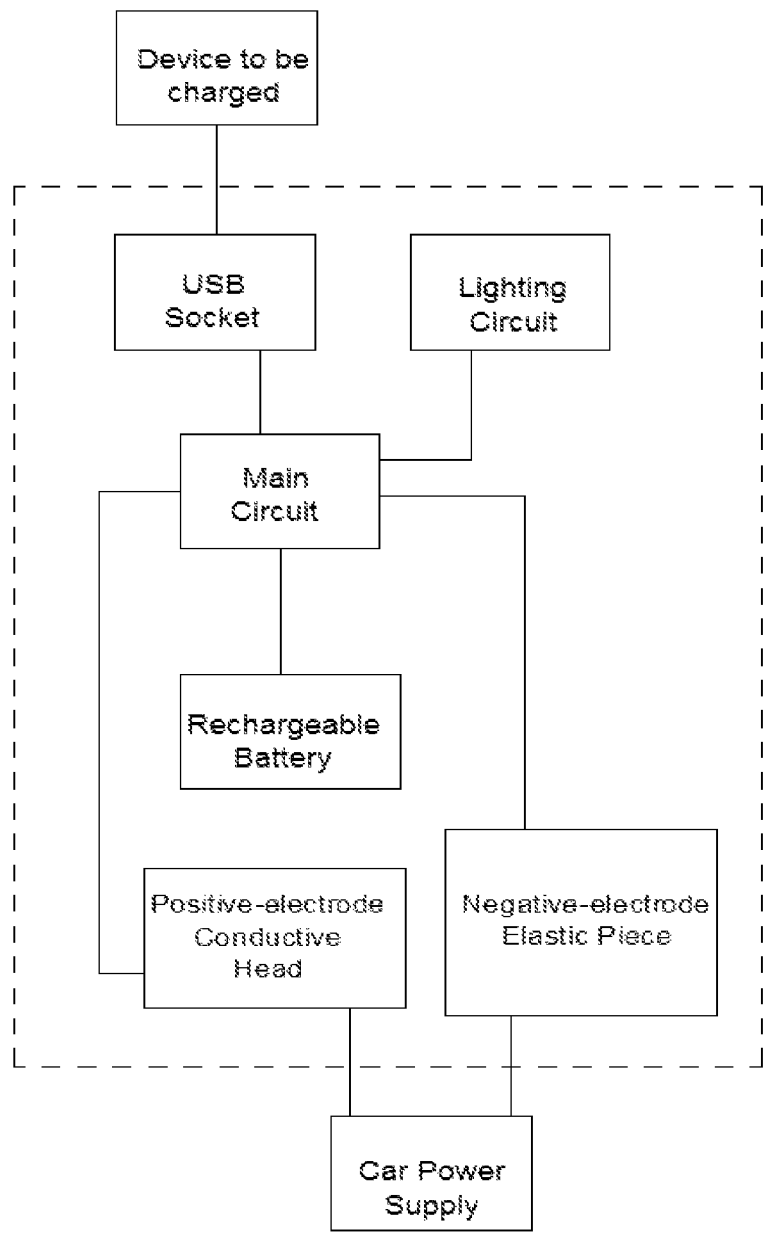
FIG. 7 is a diagram showing an electric connection relation of the car-mounted charger of the present utility model.

The main circuit 7 comprises a voltage conversion module and a charging module. With reference to FIG. 7, a diagram showing an electric connection relation of the car-mounted charger of the present utility model is provided, where the car-mounted charger is in a dashed box. When the car-mounted charger works, the first main housing 1 of the charger is inserted into a cigarette lighter hole of a car to allow the positive-electrode conductive head 21 and the negative-electrode elastic piece 22 to be connected with the positive and negative electrodes of the car power supply respectively, and power is subsequently input into the main circuit 7; the voltage conversion module of the main circuit 7 converts the voltage of the car power supply into 5V, 9V or 12V and outputs the power to the USB socket, and a user may conduct charging by connecting the USB socket with the device to be charged with a USB cable. Meanwhile, the charging module of the main circuit 7 may also charge the rechargeable battery 3. When the car-mounted charger is removed from the cigarette lighter hole, the rechargeable battery 3 supplies power to the light pieces 93 through the lighting circuit 92 when the lighting switch is pressed since the rechargeable battery 3 is connected with the lighting circuit 92 through the main circuit 7.

The car-mounted charger of the present utility model is diverse in function and may be attracted onto a car shell through the magnet as a lighting device in addition to the function of charging the mobile phone and other devices; the car-mounted charger does not need to be held by hand during the changing of a car tyre or the detection of an engine compartment, and can be used for lighting conveniently by rotating the lighting housing to adjust the light angle; the car-mounted charger has a white-light illumination light available for lighting, and a red-light warning light capable of warning a car driver behind to avoid rear-end collision; and moreover, the positive-electrode conductive head of the car-mounted charger can also be used as a window breaking cone for breaking a car window to escape from the car in emergency circumstances.

The present invention is not limited to the forgoing embodiments. If various modifications and variations made to the present invention do not depart from the spirit and scope of the present invention, and if these modifications and variations fall within the scope of the claims and equivalent technologies of the present invention, the present invention shall also cover these modifications and variations.

The invention claimed is:

1. A multi-function car-mounted charger, comprising:
a main housing;
a lighting housing;
a power input portion;
a main circuits;
a rechargeable battery;
a magnet;
a power output portion; and
a lighting portion;
wherein the power input portion, the main circuit, the rechargeable battery, the magnet, and the power output portion are disposed in the main housing;
wherein the lighting portion is disposed in the lighting housing;
wherein the power input portion, the rechargeable battery, the power output portion, and the lighting portion are electrically connected with the main circuit respectively;
wherein the power input portion comprises a first electrode and a second electrode, both of which are electrically connected with the main circuit respectively; and
wherein the first electrode is provided with a cone body.

2. The multi-function car-mounted charger of claim 1, wherein the first electrode is a positive-electrode conductive head, which comprises a thread portion and a cone body; and
wherein the thread portion is in thread engagement with the main housing, and the cone body is fixed on an end face of the thread portion.

3. The multi-function car-mounted charger of claim 2, wherein the magnet and the rechargeable battery are elongated and are both fixed in the main housing in parallel, and the magnet is positioned against an inner wall of the main housing.

4. The multi-function car-mounted charger of claim 2, wherein the power output portion is a USB socket, and the main circuit comprises a voltage conversion module; and
wherein power is input into the main circuit from the power input portion, and the voltage conversion module of the main circuit outputs the power to the USB socket after converting a voltage.

5. The multi-function car-mounted charger of claim 2, wherein the lighting portion comprises a lighting circuit and light pieces; the lighting circuit is electrically connected with the main circuit, and the light pieces are electrically connected with the lighting circuit; and
wherein the lighting housing is rotatable relative to the main housing to adjust a lighting angle of the light pieces.

6. The multi-function car-mounted charger of claim 1, wherein the second electrode is a U-shaped negative-electrode elastic piece, two sides of which are provided with projection portions; and
wherein a side wall of the main housing is provided with two negative-electrode through holes, the negative-electrode elastic piece is fixed in the main housing, and the projection portions project through the negative-electrode through holes and are exposed out of the main housing.

7. The multi-function car-mounted charger of claim 6, wherein the magnet and the rechargeable battery are elongated and are both fixed in the main housing in parallel, and the magnet is positioned against an inner wall of the main housing.

8. The multi-function car-mounted charger of claim 6, wherein the power output portion is a USB socket, and the main circuit comprises a voltage conversion module; and
wherein power is input into the main circuit from the power input portion, and the voltage conversion module of the main circuit outputs the power to the USB socket after converting a voltage.

9. The multi-function car-mounted charger of claim 6, wherein the lighting portion comprises a lighting circuit and light pieces; the lighting circuit is electrically connected with the main circuit, and the light pieces are electrically connected with the lighting circuit; and
wherein the lighting housing is rotatable relative to the main housing to adjust a lighting angle of the light pieces.

10. The multi-function car-mounted charger of claim 1, wherein the magnet and the rechargeable battery are elongated and are both fixed in the main housing in parallel, and the magnet is positioned against an inner wall of the main housing.

11. The multi-function car-mounted charger of claim 1, wherein the power output portion is a USB socket, and the main circuit comprises a voltage conversion module; and
wherein power is input into the main circuit from the power input portion, and the voltage conversion module of the main circuit outputs the power to the USB socket after converting a voltage.

12. The multi-function car-mounted charger of claim 1, wherein the lighting portion comprises a lighting circuit and light pieces; the lighting circuit is electrically connected with the main circuit, and the light pieces are electrically connected with the lighting circuit; and wherein the lighting housing is rotatable relative to the main housing to adjust a lighting angle of the light pieces.

13. The multi-function car-mounted charger of claim 12, wherein the lighting portion also comprises rotary shafts, the lighting housing is articulated with the main housing through the rotary shafts, and the lighting housing is capable of rotating outwards by any angle within 90 degrees by taking the rotary shafts as a center.

14. The multi-function car-mounted charger of claim 13, wherein the rotary shafts are internally provided with electric wires, with one end fixed in the lighting housing and electrically connected with the lighting circuit, and another end fixed in the main housing and electrically connected with the main circuit.

15. The multi-function car-mounted charger of claim 12, wherein the light pieces comprise a white-light illumination light and a red-light warning light.

16. The multi-function car-mounted charger of claim 12, wherein the lighting portion also comprises a lighting switch, which comprises a button cap, a button pin and a button support;

wherein the lighting circuit is provided with a button switch, the button cap is fixed on an outer wall of the lighting housing, the button support is fixed on an inner wall of the lighting housing, the button pin is mounted on the button support and is positioned adjacent to the button cap; and wherein, when the button cap is pressed, the button pin is configured to move towards an inside of the lighting housing and is configured to start the button switch on the lighting circuit so that the lighting circuit supplies power to the light pieces.

* * * * *